H. C. CLAY.
OIL PUMP.
APPLICATION FILED JAN. 28, 1911.
993,292.
Patented May 23, 1911.
2 SHEETS—SHEET 1.
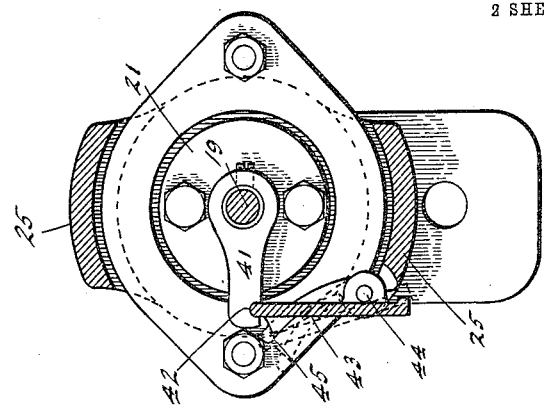
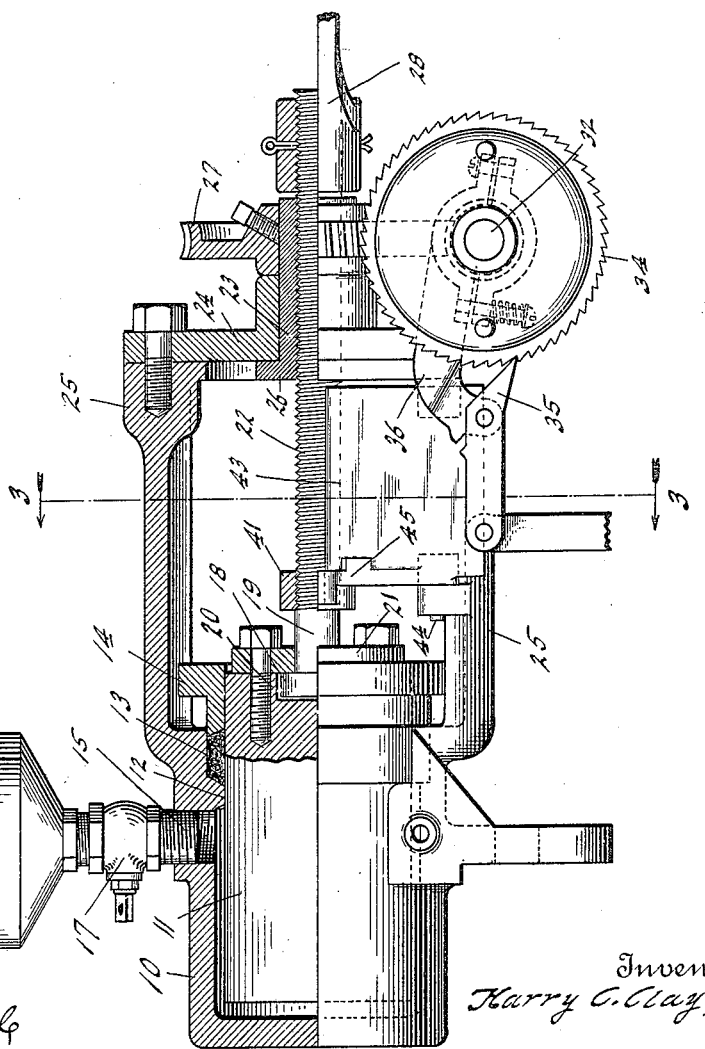
Witnesses
Frank A. Fahl
Thomas W. McMeans
Inventor
Harry C. Clay,
Bradford Hood
Attorneys H. C. CLAY.
OIL PUMP.
APPLICATION FILED JAN. 28, 1911.
993,292.
Patented May 23, 1911.
2 SHEETS—SHEET 2.
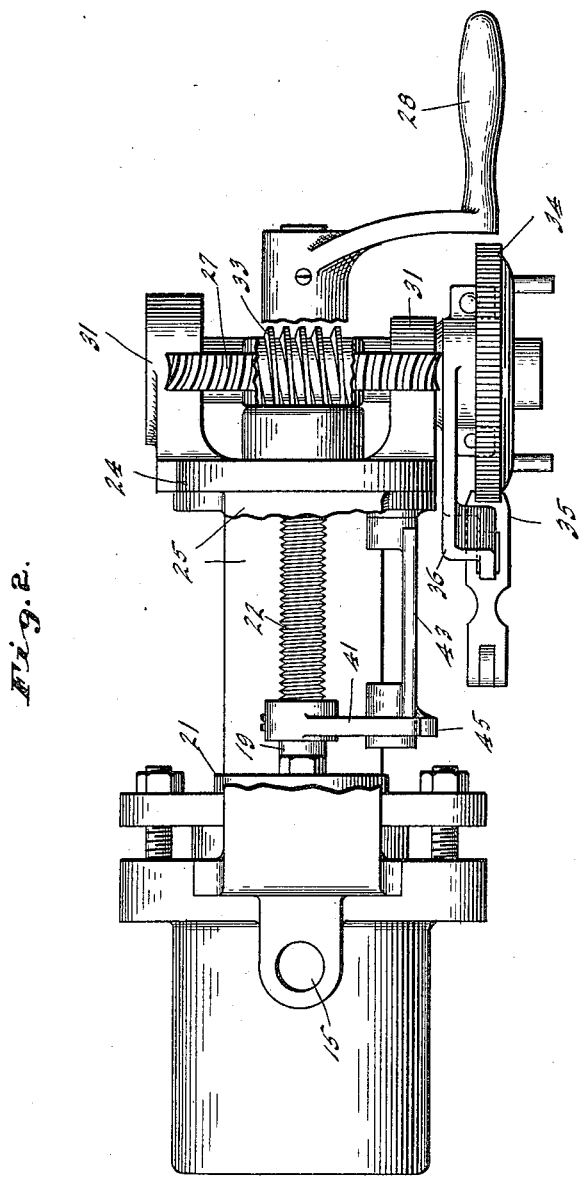
Witnesses
Frank A. Sable
Thomas W. McMeans
Inventor
Harry C. Clay,
By Bradford Hood
Attorneys.

UNITED STATES PATENT OFFICE.

HARRY C. CLAY, OF COLUMBUS, INDIANA, ASSIGNOR TO REEVES & COMPANY, OF COLUMBUS, INDIANA, A CORPORATION OF INDIANA.

OIL-PUMP.

993,292.  Specification of Letters Patent.  Patented May 23, 1911.

Application filed January 28, 1911. Serial No. 605,277.

*To all whom it may concern:*

Be it known that I, HARRY C. CLAY, a citizen of the United States, residing at Columbus, in the county of Bartholomew and State of Indiana, have invented a new and useful Oil-Pump, of which the following is a specification.

The object of my invention is to provide an apparatus by means of which a lubricant may be delivered in successive measured quantities, the invention relating particularly to the mechanism for arresting the movement of the ejecting plunger without interfering with the continued movement of the operating member.

The accompanying drawings illustrate my invention.

Figure 1 is a side elevation in partial vertical axial section of an apparatus embodying my invention; Fig. 2 a plan, and Fig. 3 a section on line 3—3 of Fig. 1.

In the drawings, 10 indicates a cylinder or lubricant receptacle in which is mounted a reciprocable plunger 11, said plunger preferably fitting the cylinder only through a short distance at the opening to the cylinder (as indicated by the finished inwardly projecting flange 12, reinforced by a suitable packing 13 and packing gland 14.) The cylinder 10 is provided with an inlet 15 with which a measuring receptacle 16 communicates through a valve 17.

At its outer end the plunger 11 is provided with a pocket 20 in which is rotatably mounted the enlarged head 18 of a stem 19, the head being retained in the pocket 20 by a ring 21 secured to the plunger. Stem 19 is provided, through the major portion of its length, with a screw thread 22 which is snugly received in a nut 23 rotatably mounted in a head 24 carried by arms 25 which project from cylinder 10. Nut 23 is provided at one end with a radial flange 26 which engages head 24 to prevent axial movement of the nut in one direction, and axial movement of said nut in the other direction is prevented by means of a worm wheel 27 which is firmly secured to the nut 23. Secured to the outer end of stem 19, so that the said stem may be rotated thereby, is a hand crank 28.

Rotatably mounted in suitable bearing brackets 31, carried by head 24, is a shaft 32 which lies at right angles to stem 19 and carries a worm 33 which meshes with the worm wheel 27. Shaft 32 carries a ratchet wheel 34 at one end and this ratchet wheel is adapted to be advanced step by step by means of a pawl 35 carried by a lever 36 sleeved upon shaft 32. Stem 19 carries a radially projecting arm 41 which is provided with a transverse notch 42 formed to receive the upper edge of a stop plate 43 pivoted at 44 upon an axis substantially parallel with stem 10. At its end nearest cylinder 10, stop plate 43 is provided with a cam portion 45 for a purpose which will appear. The arm 41 is firmly secured to stem 19 so that there can be no relative rotation and said arm engages the upper edge of the stop plate 43 so that, when in engagement with said plate, it will serve to prevent rotation of stem 19 in one direction.

In operation, advancement of shaft 32 by pawl 35 will produce step-by-step rotative advance of nut 26 so as to produce step-by-step axial advancement of stem 19 and plunger 11, rotation of the stem 19 being prevented by arm 41 engaging stop plate 43. When the plunger 11 has reached the limit of its inward movement, (as indicated in Fig. 1) arm 41 is driven to the cam portion 45 of the stop plate 43 and the resistance offered to axial movement of plunger 11 then permits rotative movement of stem 19 so that arm 41 is driven across the cam 45 so as to swing stop plate 43 out of the circumferential path of movement of the end of the stop arm 41 so that the stem 19 freely rotates with nut 26 and further advance of the plunger 11 is prevented. The operator may thereupon manipulate the hand crank 28 to drive the stem 19 axially to the right through nut 26, the arm 41 swinging freely because the stop plate 43 is out of its path of movement. When the stem 19 has been fully retracted, the stop plate 43 is thrown up under arm 41, the cylinder is refilled from the measuring receptacle 16 through valve 17 and the operation repeated.

I claim as my invention:

1. The combination of a cylinder, a plunger reciprocably mounted therein, a threaded stem connected with said plunger and independently rotatable, an axially fixed rotatable nut receiving said threaded stem, means by which said nut may be rotated, a radial finger carried by said stem, and a stop plate lying alongside said stem and arranged to receive said radial finger to prevent rotation of the same in one direction, and means by which said stem may be reversely rotated through its driving nut.

2. The combination of a cylinder, a plunger reciprocably mounted therein, a threaded stem connected with said plunger, an axially fixed rotatable nut receiving said threaded stem, means by which said nut may be rotated, a radial finger carried by said stem, and a stop plate lying alongside said stem and arranged to receive said radial finger to prevent rotation of the same in one direction, and means by which said stem may be reversely rotated through its driving nut.

3. The combination of a cylinder, a plunger reciprocably mounted therein, a threaded stem connected with said plunger and independently rotatable, an axially fixed rotatable nut receiving said threaded stem, means by which said nut may be rotated, a radial finger carried by said stem, a stop plate pivotally mounted alongside said stem upon an axis substantially parallel therewith, said stop plate having a free edge arranged to be engaged by said radial finger, and a cam carried by one end of said stop plate in position to be engaged by said finger to throw the stop plate out of the circumferential path of movement of said finger.

4. The combination of a cylinder, a plunger reciprocably mounted therein, a threaded stem connected with said plunger, an axially fixed rotatable nut receiving said threaded stem, means by which said nut may be rotated, a radial finger carried by said stem, a stop plate pivotally mounted alongside said stem upon an axis substantially parallel therewith, said stop plate having a free edge arranged to be engaged by said radial finger, and a cam carried by one end of said stop plate in position to be engaged by said finger to throw the stop plate out of the circumferential path of movement of said finger.

In witness whereof, I, have hereunto set my hand and seal at Columbus, Indiana.

HARRY C. CLAY. [L. S.]

Witnesses:
J. H. BACHTEL,
PERRY KING.

Copies of this patent may be obtained for five cents each, by addressing the "Commissioner of Patents, Washington, D. C."